Aug. 23, 1938.  K. WINKLER  2,127,577
PRODUCTION OF VALUABLE HYDROCARBONS
Filed Oct. 23, 1935
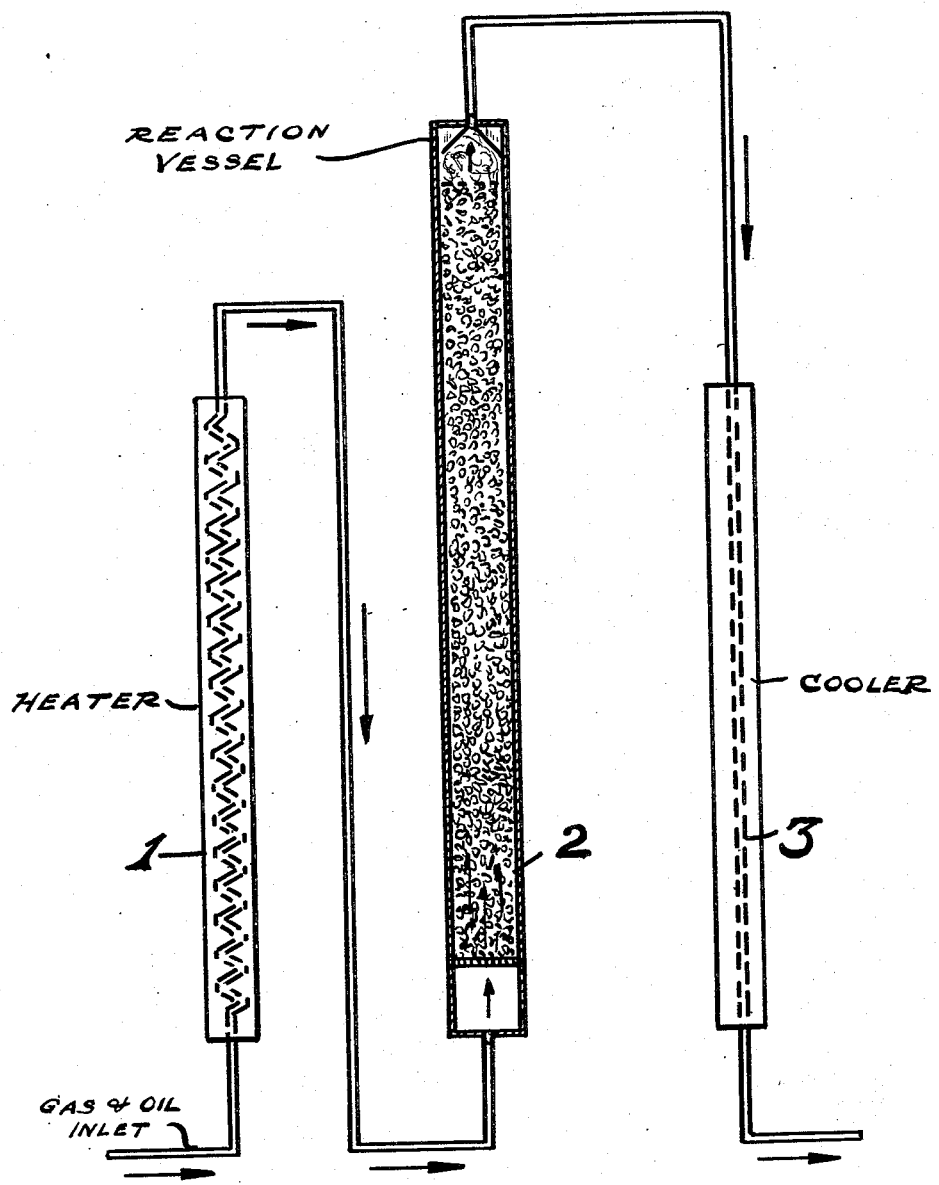

Patented Aug. 23, 1938

2,127,577

UNITED STATES PATENT OFFICE 2,127,577

PRODUCTION OF VALUABLE HYDRO-CARBONS

Karl Winkler, Leuna, Germany, assignor to I. G. Farbenindustrie Aktiengesellschaft, Frankfort-on-the-Main, Germany Application October 23, 1935, Serial No. 46,345
In Germany October 26, 1934

4 Claims. (Cl. 196—52)

The present invention relates to the production of valuable hydrocarbon products by thermal treatments, in particular those carried out with hydrogenating gases, such as destructive hydrogenation, of distillable carbonaceous material, as for example coal, tars, mineral oils, their products of hydrogenation, distillation, cracking, extraction and the like and more particularly to the application in said treatment of a catalyst new therefor.

Many catalysts have already been proposed for application in the said treatment, among which the oxides and sulphides of the metals of the 6th group are the more important.

I have now found that in the production of valuable hydrocarbon products by thermal treatments, in particular those carried out with hydrogenating gases, such as destructive hydrogenation, of distillable carbonaceous material, as for example coal, tars, mineral oils, their products of hydrogenation, distillation, cracking, extraction and the like, satisfactory results are obtained by working in contact with added graphitic acid or solid substances produced from said graphitic acid by chemical conversion, in particular, thermal decomposition, such as mellitic acid.

These additions are distinguished by a very good catalytic action in the said production of valuable hydrocarbons, and results can be obtained therewith which are not inferior, or at the most only slightly inferior, and under some circumstances even superior to those obtained when employing elements of the 6th group or their compounds.

An important advantage obtained by the present invention is that the catalyst can be readily and with comparatively little expense be prepared from indigenous materials.

The oxidative conversion of graphite may be carried out in various manners. It is of advantage to proceed in the manner specified in Example 1 or in a similar manner. As oxidizing means also agents other than potassium chlorate, such as potassium permanganate, may be employed. Also several different oxidizing agents may be used one after the other. In order to avoid any danger it is advisable not to allow the temperatures to rise beyond 60° C. At substantially higher temperatures violent explosions are liable to take place.

In many cases it is advantageous to subject the acidic products obtained by the oxidative conversion of graphite to a heat treatment, suitably a thermal decomposition before use. The said thermal decomposition may also be effected during the reaction in which the catalyst is applied.

In the production of such solid substances by thermal decomposition of graphitic acid, which is usually effected at a temperature between 200° and 350° C. a substantial increase of volume, for example, of several hundred times may occur.

The catalysts according to this invention may be employed for working in the solid, liquid or gas phase.

For example if a coal is to be subjected to a destructive hydrogenation in the form of a paste or suspension in an oil of high boiling point, colloidal graphitic acid or graphitic acid suspended in a suitable liquid, as for example water, may be applied to the coal in a finely divided form, a thermal decomposition of the graphitic acid being then effected in the presence of the coal when drying the coal or also subsequently either in a preheater or in the reaction chamber itself. In this manner there is an extremely fine and uniform dispersion of the catalyst in a highly active form. The graphitic acid may also be thermally decomposed before adding it with the coal, the decomposition products then being incorporated with the coal.

In the working up of tars, petroleums and other liquid initial materials or of residues of the same in the liquid phase, moist or previously thermally decomposed graphitic acid may, for example, be suspended in the initial materials to be treated and then introduced into the reaction chamber.

When working in the gas phase it is advantageous to arrange the graphitic acid or other solid product produced from graphitic acid, preferably after having them subjected to thermal decomposition, rigidly in the reaction chamber after a suitable shaping, as for example, pressing into the form of pills or the like.

The drawing is a diagrammatic illustration of a suitable flow plan for carrying out the above described process with the hydrogenation of carbonaceous materials over the catalysts described herein. Hydrogen gas and oil, which may contain ground coal suspended therein, are passed through heating coil 1, reaction chamber 2 and heat exchanger or cooler 3, after which the products are separated in the usual manner. The catalysts may be mixed with the feed or may be arranged in lump form in the reaction vessel, as illustrated.

The catalysts according to this invention may also be employed together with other catalysts which promote the thermal conversion of the initial materials. The elements of the 6th group of the periodic system or their compounds are especially suitable for this purpose.

Suitable catalysts are also obtained if the graphitic acid or its solid conversion products, either alone or together with other catalysts, is subjected, if desired, after a washing for the removal of water soluble acids to a treatment with hydrogen sulphide or with hydrogen sulphide and ammonia, for the production of graphitic sulphide. If desired, these catalysts may then be subjected to a thermal decomposition.

The treatment with hydrogenating gases of distillable carbonaceous materials is carried out at elevated temperature, for example, between 300° and 700° C., preferably between 380° and 550° C., say 400° to 480° C. and under increased pressure, for example of above 20 atmospheres, preferably above 50 atmospheres and the treatment may be for destructive hydrogenations, for refining hydrogenation, or for the simple addition of hydrogen to unsaturated hydrocarbons.

The catalyst in accordance with the present invention may also be applied with advantage in other thermal treatments than treatments with hydrogenating gases, such as low temperature carbonization or cracking.

The following examples will further illustrate how the invention may be carried out in practice, but the invention is not restricted to these examples.

*Example 1*

50 kilograms of graphite are introduced while stirring into a mixture of 875 liters of sulphuric acid having a specific gravity of 1.84 and 438 liters of nitric acid having a specific gravity of 1.40. 325 kilograms of potassium chlorate are added during the course of 24 hours, care being taken that the temperature of the mixture does not rise above 60° C. The reaction mass is then introduced into water and the solid oxidation product freed from water-soluble acids by washing with water. A yellowish green colored graphitic acid is obtained which is dried at ordinary temperature in vacuo and then heated in the dry state at elevated temperature as, for example, between 200° and 350° C., whereby a marked increase in volume takes place, the final apparent volume amounting to up to 600 times the original volume. An extremely loose mass similar in appearance to carbon black is obtained which may be pressed, ground and then shaped into pills. The catalyst thus obtained is arranged in a high-pressure reaction vessel. Hydrogen at 460° C. and under a pressure of 200 atmospheres is then led together with a middle oil obtained by the destructive hydrogenation of brown coal from Central Germany over the catalyst. The middle oil which only contained 2 per cent of constituents boiling up to 180° C. is thus converted into a product which contains 46 per cent of benzine boiling up to 180° C. The benzine is water-clear and requires at the most only a slight refining. It is an excellent motor fuel.

*Example 2*

Graphitic acid prepared as described in Example 1 is treated while moist with hydrogen sulphide, whereby it is converted into graphitic sulphide. After carefully drying, this product is mixed with 20 per cent of crystallized ammonium sulphotungstate and the mixture, after having been finely ground, is decomposed by heating to between 300° and 350° C., whereupon the voluminous product thus obtained is pressed into pills of which 100 cubic centimeters have a weight of 119 grams. As compared with a mass prepared in a similar manner from ammonium sulphotungstate without any admixture, this catalyst contains only 6.8 per cent of the amount of tungsten sulphide present in the same volume of the former catalyst. A middle oil obtained by destructive hydrogenation from a Mid-German brown coal is passed over this catalyst at 423° C. under a hydrogen pressure of 200 atmospheres, whereby a product is obtained which contains 55 per cent of a benzine boiling up to 185° C. The middle oil which has not been converted into benzine may be returned and thereby completely converted or it may be used as an excellent Diesel oil. The results thus obtained are the same as those obtained with a catalyst prepared from ammonium sulphotungstate without any admixture.

*Example 3*

The fraction boiling above 100° C. of a benzine obtained by destructive hydrogenation of Mid-German brown coal in the presence of catalyst consisting of tungsten sulphide, having a specific gravity of 0.738 at 20° C. and an octane value of 61 and boiling to the extent of 35 per cent below 100° C., the end boiling point being 165° C., is passed at 510° C. and under a pressure of 70 atmospheres together with hydrogen over a catalyst obtained by thermal decomposition (at about 230° C.) of graphitic acid and subsequent pressing into pills having a thickness of 4 millimeters. The properties of the initial benzine fraction and of the resulting product may be seen from the following table:

|  | Specific gravity at 20° C. | Aniline point, ° C. | Amounts in percent boiling up to— | | | |
| --- | --- | --- | --- | --- | --- | --- |
|  |  |  | 100° C. | 125° C. | 150° C. | 180° C. |
| Initial benzine fraction | 0.749 | 55.9 | 1 | 45.0 | 95.0 |  |
| Resulting product | 0.742 | 25.0 | 28.7 | 62.7 | 83.2 | 91.2 |

The loss by formation of gases amounts to about 6 per cent.

If the fraction boiling below 180° C. of the said resulting product is mixed with the fraction boiling below 100° C. which has been separated from the initial benzine, in a ratio corresponding to the ratio of the fractions in the initial benzine a benzine is obtained which has the following properties:

Specific gravity at 20° C. _____ 0.730
Aniline point, °C _____ 40.3
Amount in per cent boiling up to 100° C __ 51.5
Amount in per cent boiling up to 125° C __ 83.0
Amount in per cent boiling up to 150° C __ 99.0
End boiling point, °C _____ 156
Octane value _____ 77

The octane value is therefore by 16 points better than that of the initial benzine. The final product is a very suitable fuel for combustion in motors having a high compression, in particular aeroplane motors.

*Example 4*

5 liters of isobutane are passed per hour at 520° C. and under atmospheric pressure over 100 cubic centimeters of a catalyst which has been prepared by thermal decomposition (at about 230° C.) of graphitic acid. The resulting gas the volume of which is by 20 per cent greater than that of the initial gas contains 11 per cent of iso-butylene and 2.4 per cent of propylene. In one throughput 16 per cent of the initial gas are converted. When recirculating the unconverted gas the yield of iso-butylene may be increased to about 82.5 per cent with reference to converted iso-butane.

What I claim is:

1. In a process for the production of valuable hydrocarbon products by decomposition of distillable carbonaceous materials into lower molecular weight hydrocarbons by heating in the presence of catalysts the improvement which comprises carrying out the said heating in contact with an added conversion product of graphite selected from the group consisting of graphitic acid and graphitic sulfide.

2. The process as claimed in claim 1, in which the decomposition of the distillable carbonaceous material is a destructive hydrogenation.

3. In the process as claimed in claim 1, carrying out the decomposition of the distillable carbonaceous material at a temperature between 380 and 550° C.

4. In the process as claimed in claim 1, carrying out the decomposition of the distillable carbonaceous material under a pressure above 50 atmospheres.

KARL WINKLER.